United States Patent [19]

Britten

[11] Patent Number: 4,642,465

[45] Date of Patent: Feb. 10, 1987

[54] AVALANCHE COUNTER AND ENCODER SYSTEM FOR COUNTING AND MAPPING RADIOACTIVE SPECIMENS

[75] Inventor: Roy J. Britten, Costa Mesa, Calif.

[73] Assignee: California Institute of Technology, Pasadena, Calif.

[21] Appl. No.: 660,692

[22] Filed: Oct. 15, 1984

Related U.S. Application Data

[63] Continuation-in-part of Ser. No. 370,333, Apr. 21, 1982, Pat. No. 4,500,786.

[51] Int. Cl.$^4$ .............................................. G01T 1/185
[52] U.S. Cl. .................................................... 250/389
[58] Field of Search ......................... 250/374, 385, 389

[56] References Cited

U.S. PATENT DOCUMENTS

| | | | |
|---|---|---|---|
| 3,373,283 | 3/1968 | Lansiart et al. | 250/389 |
| 3,449,573 | 6/1969 | Lansiart et al. | 250/389 |
| 3,461,293 | 8/1969 | Horwitz | 250/389 |
| 3,717,766 | 2/1973 | Allard et al. | 250/389 |
| 3,723,788 | 3/1973 | Goto | 250/389 |
| 4,500,786 | 2/1985 | Britten et al. | 250/389 |
| 4,527,064 | 7/1985 | Anderson | 250/389 |

OTHER PUBLICATIONS

Parkhomchuck et al., "A Spark Counter with Large Area", *Nuc. Inst. & Methods* 93, No. 2, (1971), 269-270.

*Primary Examiner*—Janice A. Howell
*Attorney, Agent, or Firm*—Leonard Tachner

[57] ABSTRACT

A parallel plate counter utilizes avalanche event counting over a large area with the ability to locate radioactive sources in two dimensions. One novel embodiment comprises a gas-filled chamber formed by a stretched stainless steel window cathode spaced from a flat semiconductive anode surface between which a high voltage is applied. When a beta ray, for example, enters the chamber, an ionization event occurs and the avalanche effect multiplies the event and results in charge collection on the anode surface for a limited period of time before the charge leaks away. An encoder system, comprising a symmetrical array of planar conductive surfaces separated from the anode by a dielectric material, couples charge currents the amplitude of which define the relative position of the ionization event. A number of preferred encoder system embodiments are disclosed including a novel matrix or grid pattern of electrical paths connected to voltage dividers and charge sensitive integrating amplifiers. The amplitude of coupled current delivered to the amplifiers defines the location of the event, the spatial resolution for a given signal-to-noise ratio can be controlled by changing the number of such amplifiers.

20 Claims, 11 Drawing Figures

AVALANCHE COUNTER AND ENCODER SYSTEM FOR COUNTING AND MAPPING RADIOACTIVE SPECIMENS

CROSS REFERENCE TO RELATED APPLICATIONS

This application is a continuation-in-part of Patent Application Ser. No. 370,333 filed on Apr. 21, 1982, now U.S. Pat. No. 4,500,786.

BACKGROUND OF THE INVENTION

1. Field of the Invention

The present invention relates to an apparatus for detecting the distribution of radioactive sources over a predefined area and more particularly, to an apparatus comprising a two dimensional avalanche counter and a position encoder for precisely ascertaining the frequency of occurrence and location of particles or rays generated by radioactive sources in a structural configuration that is particularly useful for screening recombinant DNA.

2. Prior Art

A recombinant DNA is a synthetic DNA molecule containing genes from two or more different organisms. In recent years recombinant DNA has become an important tool in genetic engineering. The use of recombinant DNA permits many copies of a desired genetic region to be replicated thereby permitting analysis of gene arrangement by molecular techniques. Typically, the process involved includes the production of molecular clones by introducing recombinant DNAs into bacteria, usually a bacterial virus commonly referred to as phage or bacteriophage. The molecular clones produced in this fashion are then typically analyzed for those that obtain the desired gene or genes. In order to isolate bacterial clones to be analyzed. The recombinant DNA bearing bacteria is screened for the desired DNA. In this process the bacterial clones to be analyzed are replicated so that analysis does not destroy the clone. The bacteria can then be lysed and their DNA liberated. Typically, the DNA is liberated directly onto a nitrocellulose filter and then made radioactive by hybridizing radioactive RNA or complementary DNA to the DNAs on the filter. The filters are then rinsed making them ready for DNA location and isolation by a process called autoradiography. It is to this process known as autoradiography, namely, a process for locating radioactive DNAs on a filter, that the present invention is particularly directed.

Generally speaking, prior art autoradiography has relied upon the radioactive effect in creating an image on photographic film or X-ray film. Unfortunately, such prior art methods require that the film be exposed for very long periods of time such as days or even weeks in order to produce a visualization of the distribution and amounts of radioactively-labelled molecules. Such lengthy periods required to produce autoradiographs utilizing X-ray or photographic film, can be extremely disadvantageous and costly. As a result, a number of alternative faster techniques, including some borrowed from the nuclear particle physics art, have been considered for use in the DNA screening process for autoradiographic location of radioactive DNAs. However such prior art devices are either too cumbersome, too costly, cover too small an area or lack adequate spatial resolution. Furthermore, such prior art devices often must be operated at extremely high voltages using exotic gases at very high pressures. By way of example, a number of pertinent devices are disclosed in the following patents:

U.S. Pat. No. 3,717,766, Allard et al;
U.S. Pat. No. 3,461,293, Horowitz;
U.S. Pat. No. 3,449,573, Lansiart et al;
U.S. Pat. No. 3,975,639, Allemand;
U.S. Pat. No. 3,373,283, Lansiart et al;

Other relevant prior art has been disclosed in the parent application, Ser. No. 370,333 filed on Apr. 21, 1983 and that prior art discussion is hereby incorporated by reference into the present application.

SUMMARY OF THE INVENTION

The present invention comprises a simply constructed parallel plate counter that utilizes avalanche event counting over a large area with the ability to locate radioactive sources in two dimensions. The counter has the capacity for simultaneously registering radioactivity over a large area and is useful for a variety of laboratory applications including gel electrophoresis of DNA fragments and thin layer chromotography. The counter comprises a thin stretched stainless steel window cathode spaced from a flat anode surface. When a beta ray or other radioactive particle or ray enters the space between the cathode and anode, an ionization event occurs in a filling gas contained within that space. The ionization event results in an avalanche of ionization multiplying the event by almost one hundred million. The charge rests for a short time on the surface of the anode and then leaks away. A plurality of electrical pickups provide means for processing a current induced by each avalanche event.

The invention also comprises an encoder system designed to permit calculation and definition of the position of each such event. In one embodiment, the coding surface used with the counter comprises a modest number of square electrical conducting sheets which are almost contiguous to one another. It is believed that this coding system is unique because of the way in which the signal is distributed between adjacent coding elements. The avalanche ion current is collected on the anode surface which is a small distance from the coding surface. As a result, the induced signal spreads to several coding elements. The charge is capacitively coupled to several coding elements. The resulting signal distribution is almost linearly dependent on the event position from the center of one element to its edge. During the counting process the formation of an avalanche in a high electric field strength in a gas mixture delivers an average of about one picocoulomb to the anode surface for every primary ionization event near the cathode surface due to, for example, a beta ray entering the counter. The electrons are collected quickly on the anode surface and the positive ions migrate in about 10 to 20 microseconds to the cathode. The coding system used to locate the charge employs capacitive coupling between the coding elements and the collected charge. In one embodiment, the coding surface comprises 144 one-half inch squares of conductive silver paint, hand painted on a glass surface. Alternatively, other conductive layers may be used and affixed in any manner. Each square is connected to a two dimensional matrix of conductors, (i.e., to a column conductor with a 10 picofarad capacitor and also to a row conductor with another capacitor of the same value). These capacitors isolate the rows and columns so that interactions between rows and columns are minimized. The coding is solely dependent upon the position of the avalanche in the column and row dimension. Each row and column is connected to a charge integrating amplifier in a coding system that provides a spatial resolution better than 1 millimeter.

Other embodiments of the encoding system are disclosed herein. In one such additional embodiment each coding square is divided into a series of fine interdigitized fingers which are equal in area and therefore transmit a direct half share of the charge to a column and to a row. Still an additional embodiment comprises a structure which consists of many fine wires in perpendicular directions with a spacing of approximately 1/10 of an inch. Each wire is connected to two adjacent wires with precision resistors or capacitors. As will be seen hereinafter this last mentioned embodiment of the encoding system of the present invention provides some significant advantages in both facilitating manufacture and also in providing far more flexibility between the interface of the encoding system and the amplifiers which are used to transfer signals for decoding as will be hereinafter more fully explained.

OBJECTS OF THE INVENTION

It is therefore a principal object of the present invention to provide a novel two dimensional avalanche counter for locating radioactive sources over a large area with a resolution sufficient to render the counter especially useful for DNA screening and replication.

It is an additional object of the present invention to provide a novel encoder system tht is especially adapted for use with the aforementioned counter and which provides the ability to accurately locate a radioactive event detected by the counter whereby to enable mapping of such events that occur over a selected period of time.

It is an additional object of the present invention to provide a combined two dimensional avalanche counter and encoder therefor for locating radioactive sources in two dimensions with high resolution over a large area for detecting lightly ionized particles such as beta rays and wherein the encoder comprises a plurality of almost contiguous planar conductive surfaces each electrically coupled to a pair of perpendicular wire conductors for generating signals indicative of the location of the detected ionizing event whereby counting and mapping of such events may be accomplished.

It is still an additional object of the present invention to provide a combined two dimensional avalanche counter and encoder therefor for locating radioactive sources in two dimensions over a large area with high resolution and wherein the coding system comprises a plurality of almost contiguous planar conducting surfaces, each such surface being configured as two sets of interdigital fingers in which each takes a direct half share of the charge produced on such surface by said counter and wherein each such set of fingers is electrically coupled to one of two perpendicular wire conductors for enabling precise location of each such detected radioactive event.

It is still an additional object of the present invention to provide a two dimensional avalanche counter and encoder therefor, the combination having the ability to locate radioactive sources in two dimensions over a large area with high resolution and wherein the encoder comprises an array of fine, closely spaced wires located in a common plane within a specified geometrical configurtion, said wires being interconnected to adjacent wires by precision resistors to enable precise location of a charge induced on such wires by the occurrence of a detected radioactive event.

BRIEF DESCRIPTION OF THE DRAWINGS

The aforementioned advantages and objects of the present invention, as well as additional objects and advantages thereof, will become more apparent hereinafter as a result of a detailed description of preferred embodiments thereof when taken in conjunction with the accompanying drawings in which.

DETAILED DESCRIPTION OF PREFERRED EMBODIMENTS

Figure 1:
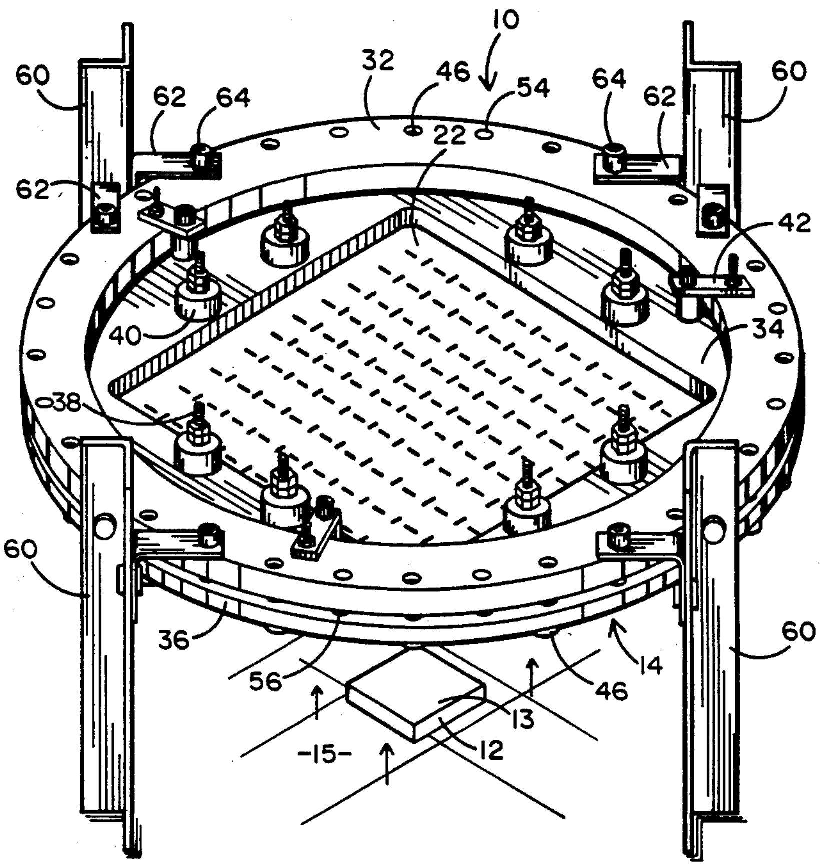
FIG. 1 is an isometric view of the combined two dimensional avalanche counter and encoder system of the present invention in an embodiment that has been reduced to practice.

Reference being had to FIGS. 1, 2, 3 and 4, it will be seen that an avalanche counter and encoder system 10 of the present invention comprises the following principal components: Namely, a cathode membrane 14, an anode surface 18, a pair of glass plates 20 and 22, plate 20 comprising an anode layer and 22 comprising a coding surface support layer. In addition the invention comprises a plurality of coding surface elements 24, a plurality of coupling capacitors 26 and a series of matrix configured wires 28, each such wire connected to a charge sensitive preamplifier 30. As seen best in FIG. 2, cathode membrane 14 is spaced from anode layer 20 to form a chamber 16 therebetween occupied by a selected gas mixture to be described hereinafter. The anode layer 20 is preferably coated with a high resistance anode surface coating 18 facing the chamber 16 and an electric field is applied between the anode surface 18 and the cathode membrane 14 by applying a relative direct current voltage therebetween of, for example, 5,000 volts. The two layers 20 and 22 are in physical contact with one another and the surface of coding support layer 22 opposite layer 20 is coated with a plurality of coding surface elements 24. In fact each such coding surface element is a square-shaped, highly conductive material such as silver that is in effect painted onto the coding surface support layer 22 and each is capacitively coupled by capacitors 26 to a conductive matrix wire 28 which is in turn connected to a charge sensitive preamplifier 30.

Figure 3:
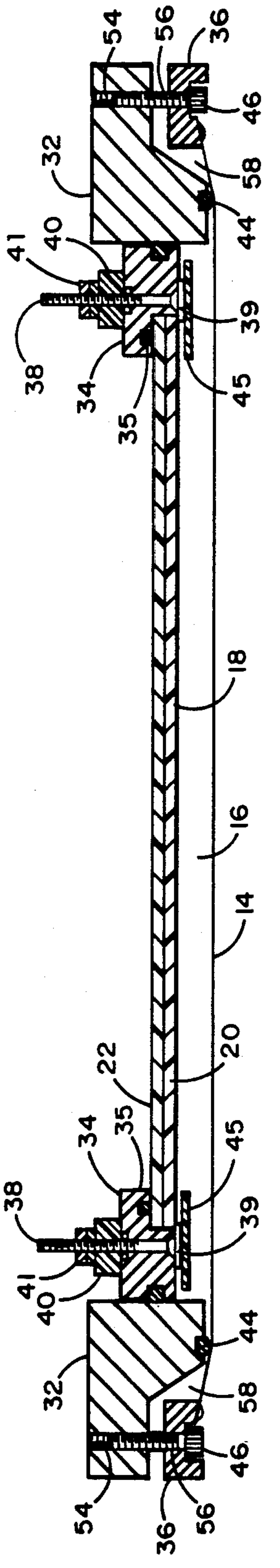
FIGS. 3 and 4 provide respective cross-sectional views of the detailed structure of the embodiment of the invention shown in FIG. 1.
Figure 4:
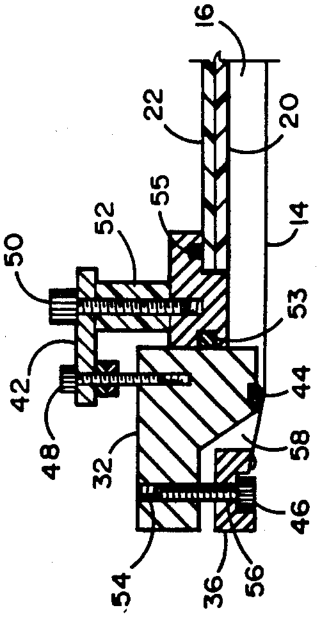

The structural relationship between the various principal components of the avalanche counter and encoder system 10 of the present invention may be more fully appreciated by reference to FIGS. 1, 3 and 4. As seen in those figures, the system 10 is elevated above a test specimen 12 upon which is located a radioactive workpiece 13. Workpiece 13 and test specimen 12 rest on a vertically adjustable surface 15 for being raised into position whereby radioactive workpiece 13 comes into substantial contact with cathode membrane 14. Typically, much larger workpieces can be accommodated. Workpiece 13 is shown smaller for purposes of clarity. One principal structural component of avalanche counter and encoder system 10 is a window support ring 32 which in the particular embodiment illustrated, comprises an annular-shaped aluminum alloy ring having a 24 inch outer diameter and an 18 inch inner diameter and a vertical thickness of approximately 2 inches. Lying within the window support ring 32 in substantially contiguous concentric relation thereto is an anode support 34 typically made of a high dielectric material such as Kevlar. As seen best in FIG. 4, anode support 34 is secured to the window support ring 32 by a plurality of ring/support interconnects 42 spaced at substantially regular intervals around the inner perimeterof window support ring 32. Each such ring/support interconnect 42 is secured to window support ring 32 by a bolt 48 and to anode support 34 by a bolt 50 spaced therefrom by properly dimensioned spacer 52.

As seen best in FIGS. 1 and 3, a major central portion of anode support 34 is cut out to form a substantially square outline with rounded corners. This cutout is adapted to receive the pair of glass layers 20 and 22. As seen further in FIG. 9, the substantially square cutout is configured to have the flange surface 35 extending therefrom and adapted to receive the glass layers 20 and 22 in overlapping engagement therewith and to provide sealing contact with the coating surface of glass layer 22 by means of an O-ring 55 extending around the square cutout. The two glass layera 20 and 22 are secured to the anode support 24 by means of a glass holder pin 38 the threaded end of which extends upwardly through anode support 34 and is secured thereto by a dielectric washer 40 and one or more nuts 41. The lower end of glass holder pin 38, which extends into the chamber 16, is capped with a retaining head 39 configured to partially overlap the edge of surface 18 of anode layer 20. In this manner, the glass layers 20 and 22 are held in secure compressive engagement with anode support 34. A teflon annular ring 45 is preferably secured to the heads 39 to prevent inadvertent sparking. As previously indicated, the membrane 14 cooperates with the anode glass layer 20 to form a gas filled chamber therebetween, the purpose of which will be more fully described hereinafter. In order to seal chamber 16, window support ring 32 and anode support 34 are each provided with suitable slots for receiving a membrane O-ring 44 and a sealing P-ring 53, respectively. Sealing O-ring 53 provides a gas-tight seal between window support ring 32 and anode support 34 while membrane O-ring 44 provides a gas-tight seal between membrane 14 and window support ring 32.

Membrane 14 is a thin stretched stainless steel window spaced about 0.15 inches away from the flat anode surface 18. The membrane is stretched over O-ring 44 by a set of screws 46. Screws 46 are used to secure membrane support ring 36 in relative spaced relation to window support ring 32 forming a gap 58 therebetween. Each screw 46 is threaded to mate with a threaded bolt hole 54 in window support ring 32 as well as with an aligned unthreaded bolt hole 56 in membrane support ring 36.

Cathode membrane 14 is welded to membrane support ring 36 whereby tightening of bolts 46 decreases the gap 58 between window support ring 32 and membrane support ring 36 thereby increasing the radial tension applied to cathode membrane 14 and increasing the sealing engagement between membrane 14 and membrane O-ring 44. In this novel configuration the cathode membrane of window 14 of the present invention may be stretched like a banjo head to provide a smooth and precisely planar surface with which radioactive specimens may be placed in direct contact.

As seen further in FIG. 1, the described structure is supported by a plurality of leg brackets 60 spaced regularly around the periphery of window support ring 32 and membrane support ring 36 and connected thereto by a plurality of angle brackets 62 and corresponding bolts 64. However the manner in which the present invention may be suspended above a test specimen and the manner in which such test specimen is elevated to bring a radioactive workpiece in contact with the membrane of the invention are not deemed to be critical to the present invention nor novel elements thereof.

Figure 11:
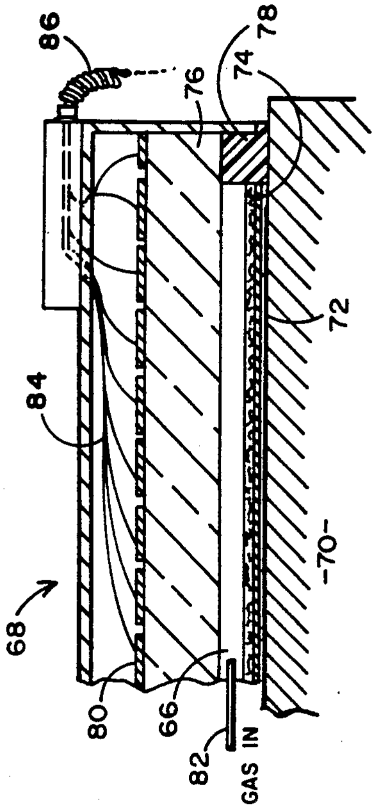
FIG. 11 is a sectional view of an earlier embodiment of a spark chamber configurtion of the invention originally disclosed in the parent application.

Although the detailed structural configuration of the present invention as illustrated in the embodiment shown in FIGS. 1, 2, 3 and 4, differs substantially from the details of construction of the spark chamber disclosed in applicant's parent application, now U.S. Pat. No. 4,500,786, some of the basic conceptual design of the embodiment illustrated in the original parent application are relatively similar as reference to FIG. 11 will show. More specifically, as shown in FIG. 11, a previously disclosed embodiment 68 comprises a support surface 70 upon which is located a radioactive workpiece 72 in substantial contact with a thin window 74. Thin window 74 provides one sealing surface of a gas filled chamber 66 which is enclosed by the opposing surface of a layer of semi-conducting glass 76 and a gas retaining seal 78. The surface of semi-conducting glass layer 76 opposite gas filled chamber 66, supports a plurality of conductive strips 80 each of which is electrically connected to a connecting cable 84. All such cables 84 are commonly routed through a single conduit or cable 86 as shown in FIG. 11. Those having skill in the art to which the present invention pertains will observe a number of significant differences between the embodiment illustrated in FIG. 11 and originally disclosed in applicant's parent application and the other embodiments illustrated herein. More specifically, many of the structural details have been improved to permit application of a high voltage DC electric field between the anode and cathode gas of the filled chamber including for example the use of the aforementioned tension controlled "banjo head" type stainless steel membrane which has been substituted for the thin window 74 of the configuration illustrated in FIG. 11. Furthermore, in the preferred embodiments, the single semi-conductor glass layer 76 of the earlier embodiment has been replaced by a pair of glass layers as earlier described. However more importantly, the coding surface forming the encoder portion of the present invention has been altered substantially to significantly reduce the complexity of the electronics associated with decoding the detection of a radioactive event and its precise location relative to the invention whereby counting and mapping a large plurality of such events in a short period of time may be more readily accomplished. These novel differences, particularly with respect to the encoding surface, will now be discussed in more detail in conjunction with FIGS. 5-8.

In the embodiments of the invention disclosed for the first time in the present application, the fundamental counting process utilizes the formation of an avalanche ion current induced in a high electric field in the gas mixture to deliver an average of about 1 picocoulomb to the anode for every primary ionization event occurring near the cathode surface due to a beta ray entering the coutner. Electrons are collected very quickly on the anode surface and the positive ions migrate in about 10–20 microseconds to the cathode. Due to the induced field from the positive ions, the charge on the anode reaches its maximum value only after the positive ions are collected. Thus, the effective counting event takes about 15 microseconds. The avalanche ion current is collected on the anode surface, which is a small distance from the coding surface. As a result, the induced signals are capacitively coupled to several coding elements. The resulting signal distribution is almost linearly dependent on the event position from the center of one element to its dege. The detailed shape of the distirbution pattern is controlled by the thickness of the glass anode support in relation to the size of the coding elements. In one embodiment of the invention shown in FIG. 2 this ratio is about 2-1. The square coding elements are ½ inch on each edge and the anode support layer is ¼ inch thick. The pattern of coding elements 24 almost entirely covers the coding surface and is symmetrical in the row and column directions. As a result, the row signal ratio is not affected by the column signal ratio and vice versa. This independence of row and column signals simplifies any mapping corrections that may be required and facilitates higher speed processing.

Figure 2:
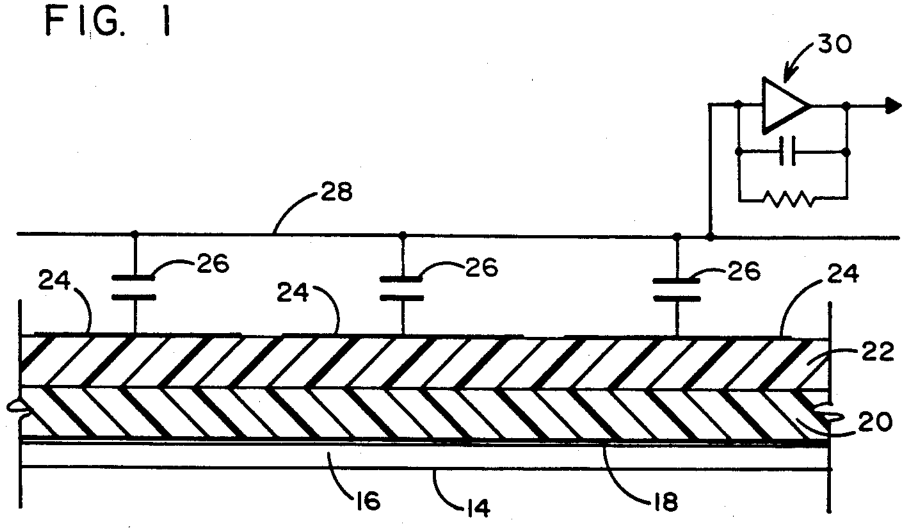
FIG. 2 is a simplified cross-sectional view of the embodiment of the invention illustrated in FIG. 1.

As shown in FIG. 2, each set of coding elements 24 that form a column or row are coupled by capacitors 26 into a common wire conductor 28 which is in turn connected to a charge sensitive integrating pre-amplifier 30. To reduce the number of amplifiers, each entire row and each entire column is connected to a single amplifier. As a result the number of amplifiers is reduced to only the sum of the number of elements in one row plus the number of elements in one column and thus varies linearly with the size of the counter for a given resolution. If each coding element were alternatively connected to its own amplifier, then the number of amplifiers would rise as the number of coding elements and thus that number would rise as the square of the size of the counter for a given resolution. Accordingly, a significant savings is achieved by significantly reducing the number of amplifiers.

Each element is a member of a row as well as of a column and therefore each coding element must share its signal equally between a row amplifier and a column amplifier. In the embodiment of FIG. 2 this is accomplished by coupling through equal pairs of capacitors 26. The charge integrating amplifiers such as amplifier 30, have low input impedance so that no significant signal is cross coupled to inappropriate rows or columns through the network of capacitors 26. The resolution of the system can be varied and in fact can be made equal to any desired level by decreasing the size of the coding elements and increasing their total number. Of course the thickness of the anode support glass would then be reduced to maintain the pattern of signal distribution. In practice it has been found that resolution equal to a small fraction of one millimeter is obtained with half inch coding elements. One embodiment of the invention employing the square coding elements and reduced to practice uses 24 amplifiers to code signals from a 7×7 inch counter anode and the spacing between anode and cathode is about 0.15 inches with the counter operating at about 5 kilovolts between anode and cathode.

In another embodiment, namely, a larger counter corresponding to the embodiment illustrated in FIG. 1, the anode is a 12 inch square and the encoder comprises square coding elements of ¾ inches on each side. The cathode window is stretched over a 20 inch diameter O-ring which suppresses the ring to which the window foil is welded. This "banjo head" configuration is uniformly flat over a large area. The method of collecting the signals on the anode surface and capacitively coupling those signals through the insulating glass anode support increases the input impedance seen by the amplifiers. This has the valuable effect of reducing amplifier noise significantly. The semi-conductor layer 18 on the anode surface allows the collected charge to eventually drain off. The semi-conductor surface must have a resistance that is not too small, otherwise the charge collected as a result of each avalanche will leak off in less than the 10–20 microseconds required for collection of the positive ions. The surface resistance and the capacitance to the coding elements sets the rate of flow of charge and the effective charge dissipation time. The upper limit to the resistance is set by the required maximum counting rate. If the resistance is too large a local high count rate region could polarize the anode with undissipated charge and establish a saturation maximum local counting rate. For example, at 120 counts per minute, in one spot the current would be less than 1 nanoamp and the resistivity could be up to 1,000 megaohms per square with small effect on the counting rate. The resistance of the semi-conductor layer 18 should be in the 10 to 1,000 megaohms per square range.

A number of semi-conducting glass coatings would be suitable for use as coding 18 of FIG. 2. For example, Birox is a suitable semi-conducting glass coating available from the DuPont Company. Birox has a resistivity of 30 megaohms per square when melted onto alumina. In another embodiment, anode surface coding 18 was implemented using a carbon filled paint which results in a surface resistance of about 1 gigaohm.

In one embodiment of the present invention the coding surface comprises 144 squares of silver hand painted on a glass surface with each square having a dimension of ½ inch on each side. Each square is connected to a column conductor with a 10 picofarad capacitor and also to a row conductor with another 10 picofarad capacitor. These capacitors adequately isolate the rows and columns so that there are no interactions. The coding for position determination is strictly dependent upon the position of the avalanche in each of the row and column dimensions. Each of the 24 conductor lines to which the respective rows or columns are connected, is in turn connected to a charge integrating operational amplifier also called charge sensitive pre-amplifier 30 as seen in FIG. 2. In one configuration each such amplifier is ganged with the amplifier two positions away, that is, the amplifier used for connection to a row or column spaced by two rows or columns. This is one implementation scheme that permits a reduction in the amount of electronics required to process the encoded informtion, although there is some sacrifice in signal to noise ratio.

Figure 5:
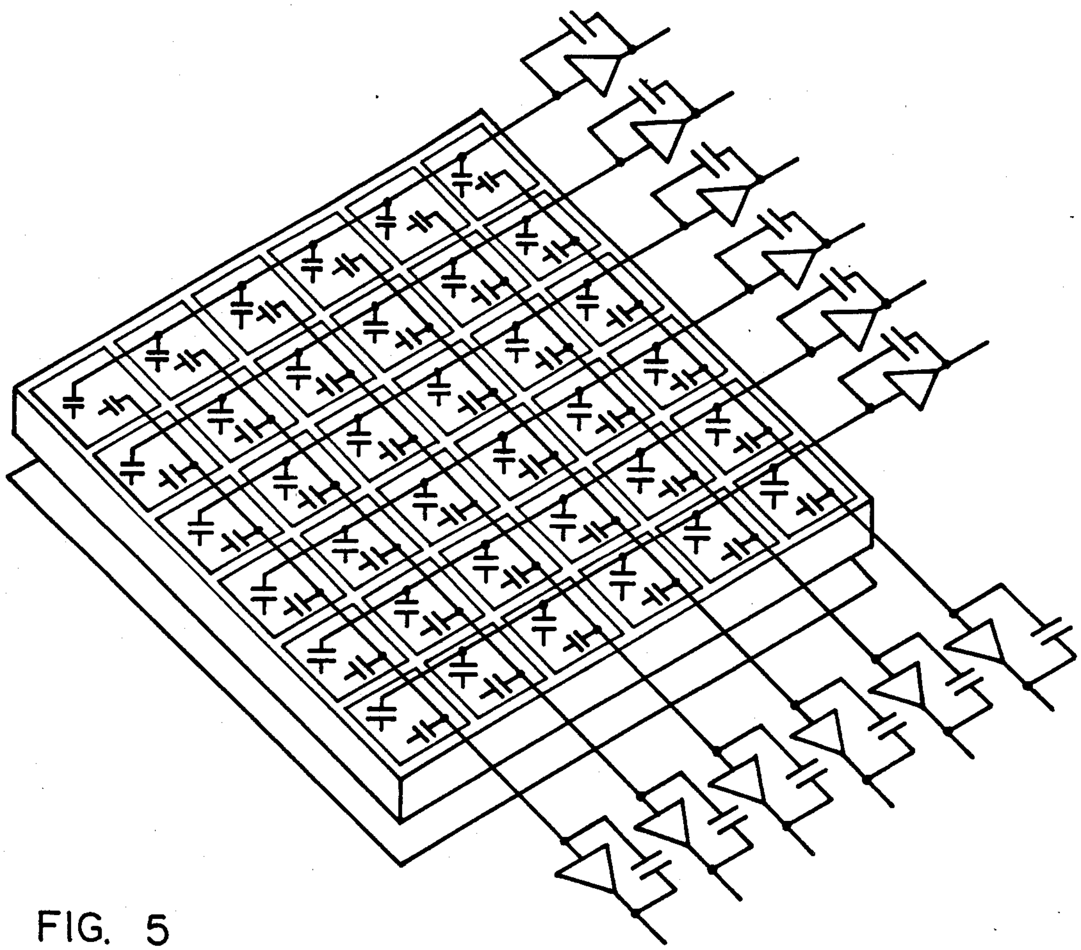
FIGS. 5 and 6 are isometric views, partially schematic in nature, of alternative embodiments of the invention which utilize capacitive coupling from the encoder surface thereof.
Figure 6:
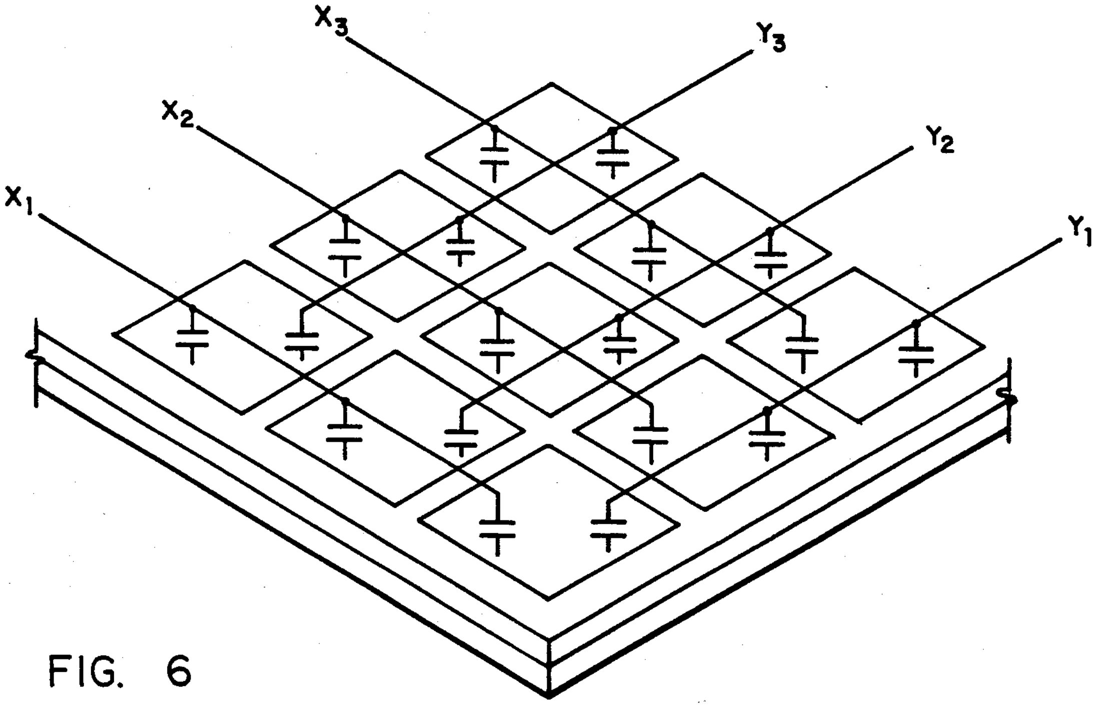

FIGS. 5 and 6 illustrate two different embodiments of the present invention that employ a matrix of square coding elements. Each such element is capacitively coupled to row and column conducting wires. Each such wire is connected to a charge sensitive preamplifier 30 as mentioned previously. FIG. 5 provides an exemplary illustration of a capacitively coupled encoding surface and counter combination in which the counter utilizes a single layer of glass, one side of which is coded with the high resistance anode surface and the other side of which is coded with the plurality of square coding elements as shown in FIG. 5. A slightly different embodiment is shown in FIG. 6. A portion of the encoding elements are shown in an encoding configuration in which two different layers of glass separate the high resistance anode surface coding and the plurality of encoding elements. The single glass layer configuration of FIG. 5 finds closer similarity to the configuration of the invention illustrated in FIG. 11 and originally disclosed in the parent application. However it has been found that the double layer glass configuration of FIG. 6 is more suitable for ease of manufacture and assembly. In either case, electrical charges are induced on more than one coding element as a result of the charge collected on the anode surface. The fraction of the charge induced on the coding elements near the event location depends on the position of the event relative to the neighboring coding elements.

The intervening dielectric medium may be glass as illustrated in the configurations of FIGS. 5 and 6 or maybe in some other material which also has a dielectric constant greater than air so as to efficiently couple the charge at the event location to the coding elements. When an event occurs and a charge is deposited on the anode, an induced charge occurs on the encoding elements leading to a pulse current at the input of the amplifiers connected to the coding elements. The pulse characteristics depend on the distance from the coding element to the charge location. The thickness of the intervening medium between the anode surface and the coding elements is chosen in relation to the coding element size so that only a few coding elements respond to the principal part of the signal while a sufficient number of such elements responds so that sharing of the signal occurs between adjacent coding elements.

The anode surface is coated with a semi-conducting layer which permits the charge to leak away but not before the event is complete and the amplifiers accurately respond to the induced signal. The time constant of this leaking process is set short enough so that the voltage present locally due to repeated events is still so small that it does not interfere with the operation of the counter.

Figure 7:
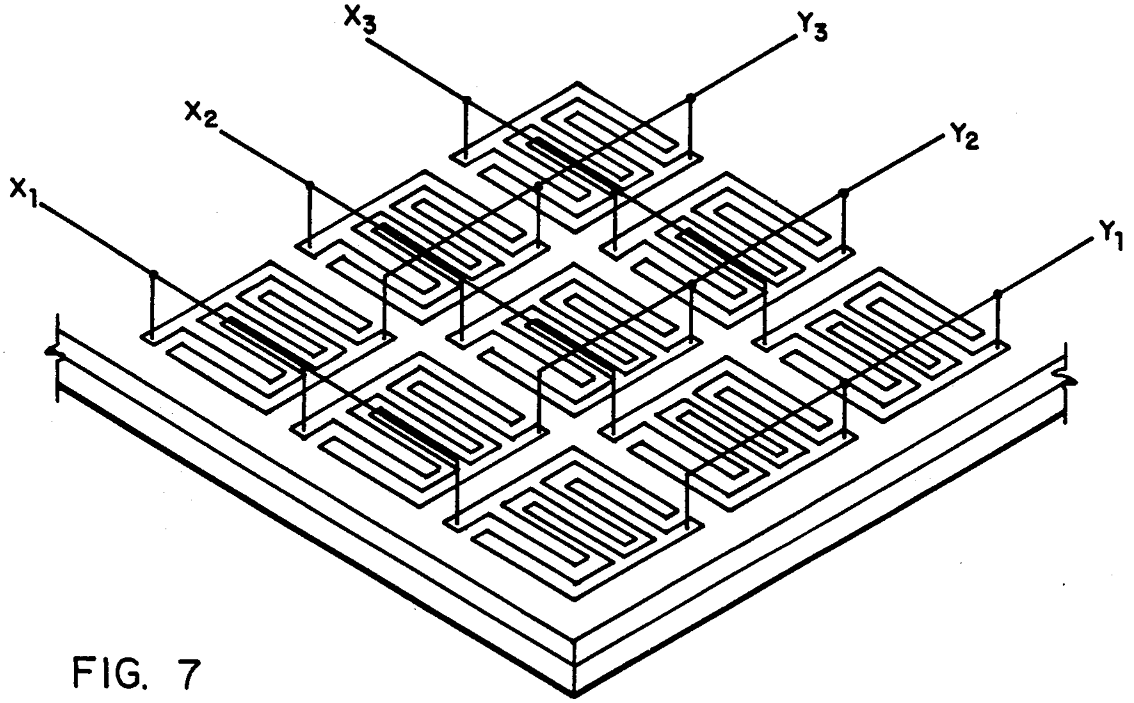
FIGS. 7 and 8 are isometric views, partially schematic in nature, of still additional alternative embodiments of the present invention utilizing other means for coupling the avalanche-induced charge signal from the encoder to circuitry that may be used for defining the position of the charge.
Figure 8:
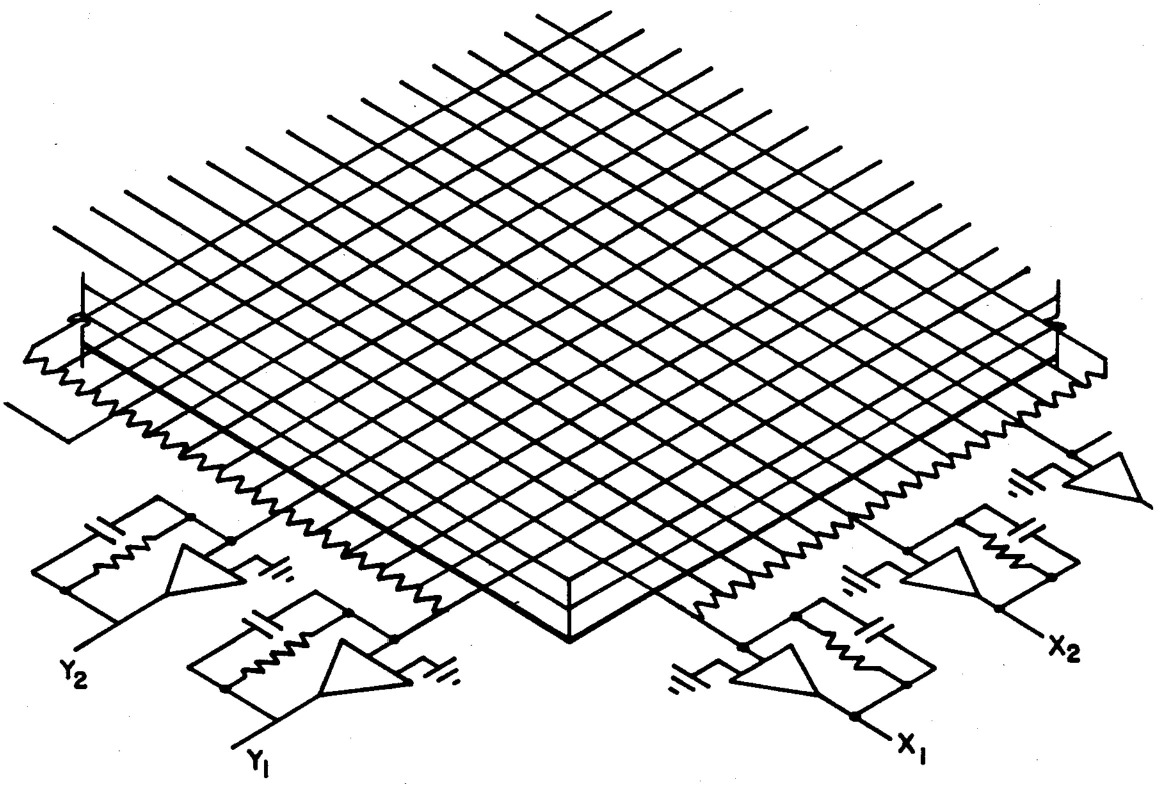

Two additional embodiments of the encoder portion of the present invention are shown in FIGS. 7 and 8, respectively. In the configuration of FIG. 7 each coding square is divided into a series of fine fingers with the fingers of the square for connection to a row conductor being interdigitized with the fingers of the square connected to a column conductor. Each set of fingers of the respective squares takes a direct one half share of the charge because of the equality of area of the respective sets of fingers. The coupling of the charge induced currents between the fingers and the respective column and row conductors may be accomplished capacitively in the same manner as described previously in conjunction with the embodiments of FIGS. 5 and 6. However, capacitors have been omitted from FIG. 7 in order to avoid obfuscation of the coding square geometry. The performance of the coding configuration of FIG. 7 is the same as the coding configuration of FIGS. 5 and 6. However, the interdigitized finger arrangement of FIG. 7 is easier to manufacture and maintain.

The coding configuration of FIG. 8 is fundamentally different and is a significant improvement over the configurations of FIGS. 6 and 7. In this configuration the coding plane comprises a matrix array of fine conducting wires on the coding surface. The wires are 0.010 inches in thickness and are spaced approximately 1/10th of an inch apart to form a grid in the row and column directions with insulation between the row and column isolating the signals that are carried by the respective wires. The wires are preferably formed by either metal deposition or photoetching. The principal advantage of the embodiment of the encoder illustrated in FIG. 8 as compared to previously described embodiments is that the number of amplifiers is independent of the spacing and size of the coding elements. That is, the amplifiers connected to every third wire or alternatively, to every 10th or 100th wire depending upon the service intended. The choice of the number of amplifiers connected is made on the basis of the signal to noise ratio in relationship to the resolution required. Various patterns of amplifier connections can be used with a single grid pattern. Each charge integrator amplifier connection is a low impedance point on an array of resistors or capacitors to which the wires are connected. Thus current induced in the region between two amplifier connections flows only to the two nearest amplifiers. The fraction of charge flowing to the two adjacent amplifiers is split almost exactly in proportion to the position of the event relative to the amplifiers. In effect, the segment of the line resistors or capacitors between the two amplifiers forms a potentiometer with its two ends grounded by the two amplifiers.

Figure 9:
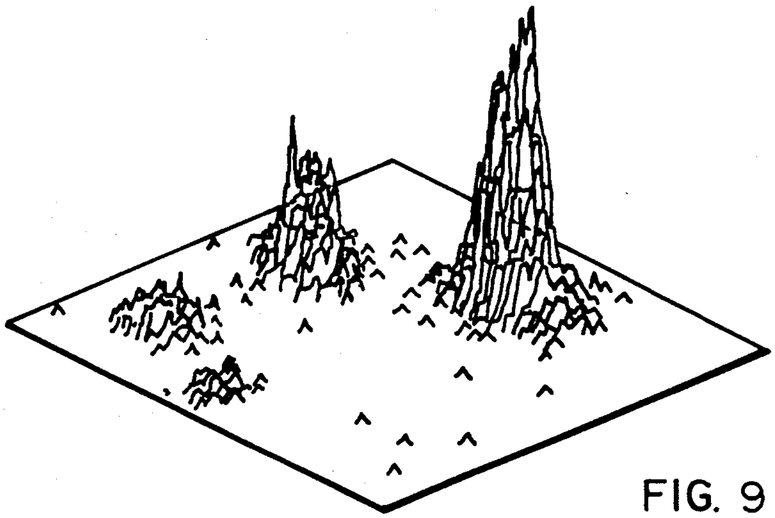
FIG. 9 is a three-dimensional view of a map of a radioactive source, the map having been produced by utilizing the present invention.
Figure 10:
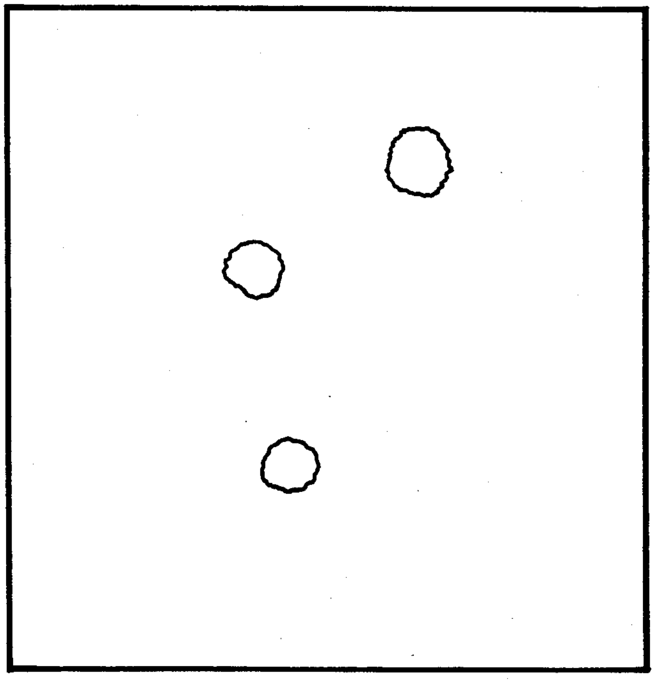
FIG. 10 is a two dimensional representation of the type of map that may be generated using prior art conventional X-ray autoradiography means.

As previously indicated, the main advantage of the present invention in its application to DNA screening results from the significantly reduced time required to map radioactive sources on a test specimen. An example of this advantage may be seen by comparing FIGS. 9 and 10. FIG. 9 represents a three dimensional view of a histogram utilizing data derived from a counter of the present invention. FIG. 10 is a 24 hour autoradiograph utilizing an intensifying screen at −70 degrees Centigrade and conventional X-ray film techniques. The data utilized to derive the three-dimensional view of FIG. 9 took twelve minutes to acquire using the present invention, while the time required to develop the X-ray autoradiograph of FIG. 10 was 24 hours. Thus there is a time ratio of approximately 120 to 1. In both cases there were four spots of about 8 millimeters in diameter and the spots were known to have radioactivity corresponding to counts per minute per square millimeter of 15, 5, 1.6 and 0.4, respectively. The counter configuration, utilizing an embodiment of the present invention employed a chamber filled with argon gas (8% organics) and an electrode spacing between anode and cathode of 4 millimeters. As one can readily observe, the data accumulated by the counter of the present invention in a mere 12 minutes, provides a three-dimensional view of all four spots and provides a clear indication of the relative radioactivity of each spot compared to the others. On the other hand, the X-ray autoradiograph of FIG. 10, based on accumulated data over a 24 hour period, provides an observable indication of only three of the four spots and a relatively poor indication, if any, of the difference in radioactivity of the three of the four spots that were in fact detected. Those having skill in the art to which the present invention pertains and particularly to the DNA screening application noted above, will readily appreciate the substantial advantage provided by the present invention as compared to more conventional autoradiograph techniques.

More specifically, it will now be understood that the applicant has disclosed an avalanche counter and encoder system for counting and mapping radioactive specimens particularly useful for screening recombinant DNA. The invention comprises a parallel plate counter that utilizes avalanche event counting with the ability to locate radioactive sources in two dimensions. The counter has the capacity for simultaneously registering radioactivity over a large area and is useful for a variety of laboratory applications. The counter comprises a thin stretched stainless steel window cathode spaced from a flat anode surface. When a beta ray enters the space between the cathode and anode, an ionization event occurs in a filling gas contained within that chamber. The ionization event results in an avalanche of ionization multiplying the event by almost 100,000,000. The resultant charge rests for a short time on the surface of the cathode and then leaks away. A plurality of electrical pickups using various embodiments of encoder configurations, provides means for processing a current induced by each avalanche event. The encoder system permits calculation and definition of the position of each such event. In one embodiment the coding surface comprises a number of square electrical conducting sheets which are almost contiguous with one another. The avalanche ion current is collected on the anode surface which is a small distance from the coding surface. As a result, an induced signal spreads to several coding elements. The charge is capacitively coupled to several coding elements and the resulting signal distribution is linearly dependent upon the event position from the center of one element to its edge. Other embodiments of the encoding system include a configuration in which each coding square is divided into a series of fine interdigitized fingers which are equal in area and therefore take a direct one-half share of the charge signal to be distributed to a matrix of perpendicular wires arranged in rows and columns and connected to a like plurality of charge sensitive pre-amplifiers. In an additional embodiment, the encoder consists of a structure with many fine wires in perpendicular arrangement with preselected spacings. Each wire is connected to adjacent wires through precision resistors which are in turn connected to amplifiers at selected positions to provide the requisite resolution of detection at a specified signal to noise ratio.

It will be understood that the present invention provides a novel two dimensional avalanche counter for locating radioactive sources over a large area with resodilution sufficient to render the counter especially useful for DNA screening ane replication. The counter provides the ability to accurately locate a radioactive event detected by the counter whereby to enable mapping of such events that occur over a selected period of time. The counter is combined with an encoder for locating these radioactive sources in two dimensions with high resolutions over a large area. A number of alternative embodiments of the encoder have been disclosed herein, each of which is suitable for operation in combination with the preferred embodiment of the counter also disclosed herein. However, those having skill in the art to which the present invention pertains will now perceive of various alternative embodiments as well as modifications and additions to those disclosed herein. However, each such alternative embodiment, modification and addition based on the applicant's teaching herein, is deemed to be within the scope of the invention which is to be limited only by the claims appended hereto.

I claim:

1. An apparatus for detecting radioactive sources on a test specimen, the apparatus comprising:

a counter having a gas filled chamber, said chamber being formed by an electrically conductive planar window and a parallel semiconductive surface spaced from said window, and adapted for having an electric field imposed within said chamber by a voltage differential between said window and said semiconductive surface;

an encoder surface spaced from said semiconductive surface and having geometrically arrayed elements thereon for receiving an electrical charge induced on said elements by an ion avalanche occurring within said chamber in response to entry of a radioactive particle into said chamber; and a dielectric layer between said semiconductive surface and said encoder surface, said semiconductive surface forming a coating on one side of said layer and said arrayed elements forming a coating on the opposite side of said layer.

2. The apparatus recited in claim 1 wherein said arrayed elements comprise at least thirty six substantially square elements of equal dimensions, each such element being spaced equally from all adjacent elements by a distance less than the lateral dimension of each element, the total area occupied by said arrayed elements being greater than the area of said test specimen.

3. The apparatus recited in claim 2 wherein said array of elements is arranged in a substantially square matrix of rows and columns and wherein all of the elements in a common row are connected to a common conductor and wherein all of the elements in a common column are connected to a common conductor; each of said row conductors being electrically isolated from each of said column conductors and being connected to an integrating amplifier and each of said column conductors being electrically isolated from each of said row conductors and being connected to an integrating amplifier.

4. The apparatus recited in claim 3 wherein each said element comprises two interdigitized sets of equal area fingers, one set of fingers being connected to a row conductor and the other set of fingers being connected to a column conductor.

5. The apparatus recited in claim 1 wherein said dielectric layer comprises a unitary layer of glass.

6. The apparatus recited in claim 1 wherein said dielectric layer comprises at least two contiguous layers of glass.

7. The apparatus recited in claim 1 wherein said chamber is filled with a gas comprising a mixture including argon or xenon.

8. The apparatus recited in claim 1 wherein said arrayed elements comprise a plurality of perpendicular, regularly spaced electrically insulated conductors, each such conductor being separated from adjacent parallel conductors by a selected electrical impedance.

9. The apparatus recited in claim 8 further comprising a plurality of integrating amplifiers connected to said electrical impedances at regularly spaced intervals dependent upon the desired radioactive source detection resolution and signal to noise ratio.

10. A counter for detecting radioactive sources on a test specimen; the counter comprising:

an electrically conductive planar window, a dielectric layer having a semiconductive surface parallel to and spaced from said window to form a chamber between said window and said semiconductive surface, means for sealing said chamber, a gas mixture of selected constituent gases contained within said chamber, and means for applying an electric field of selected magnitude across said chamber, said window being in a state of radial tension that may be selectively varied for assuring substantial flatness thereof.

11. The counter recited in claim 10 wherein said window comprises a thin metal material and a pair of spaced coaxial annular supports, the window being affixed along its perimeter to a first of said supports and being compressed at locations adjacent its perimeter against the second of said supports whereby adjustment of the spacing between said supports changes the radial tension applied to said window.

12. The counter recited in claim 11 further comprising resilient means between said window at said compressed locations and said second support whereby said chamber is sealed when said window is in radial tension.

13. The counter recited in claim 12 wherein said resilient means comprises an O-ring.

14. The counter recited in claim 10 wherein said electric field applying means comprises means for applying a selected electrical voltage to said semiconductor surface.

15. The counter recited in claim 11 further comprising a high dielectric insulating member connected between and to said semiconductor surface and said first support.

16. An encoder system for defining the relative position of discrete electrical charge currents, the system comprising:

a plurality of geometrically arrayed electrically conductive elements arranged symmetrically on a common planar surface.

a matrix of conducting wires arranged in substantially equal pluralities of rows and columns, each such row being associated with a selected plurality of elements and each such column being associated with a selected plurality of elements whereby a selected row and column define one and only one element, a plurality of charge sensitive integrating amplifiers, one such amplifier being connected to each row, respectively, and one such amplifier being connected to each column, respectively, means for coupling a discrete electrical charge current only to those elements within relative proximity to said discrete current, means for coupling each said element to a row wire and to a column wire which are electrically isolated from each other whereby a preselected fraction of coupled charge current is transferred to each wire defining an element, the amplitude of the respective transferred charge fraction depending upon the location of the charge current relative to the element.

17. The encoder system recited in claim 16 wherein each said element is square in shape.

18. the encoder system recited in claim 17 wherein each said square shaped element comprises two sets of interdigitized finger members, one such set being connected to a row wire and the other such set being connected to a column wire.

19. The encoder system recited in claim 16 wherein said means for coupling each element to a row wire and each element to a column wire comprises respective capacitors.

20. An encoder system for defining the relative position of discrete electrical charge currents, the system comprising:

a matrix of conducting paths arranged symmetrically on a common planar surface whereby to define a plurality of row paths and a plurality of column paths, the respective pluralities of paths being each connected to selected terminals of a voltage divider network.

a first plurality of charge sensitive integrating amplifiers respectively connected to equally spaced points along said row path network and a second plurality of charge sensitive integrating amplifiers respectively connected to equally spaced points along said column path network, means for coupling discrete electrical charge current only to those conducting paths within relative proximity to said discrete current, whereby the relative amplitude of the charge current delivered to amplifiers in each of said first and second pluralities defines the location of each discrete electrical charge current.

* * * * *